(12) United States Patent
Wu et al.

(10) Patent No.: US 9,166,488 B2
(45) Date of Patent: Oct. 20, 2015

(54) METHOD AND APPARATUS FOR RESETTING A RESONANT CONVERTER

(75) Inventors: Hongyang Wu, Shanghai (CN); Bin Wang, Shanghai (CN); Jian Jiang, Shanghai (CN); Xiaoni Xin, Shanghai (CN)

(73) Assignee: DELTA ELECTRONICS INC., Taoyuan County (TW)

( * ) Notice: Subject to any disclaimer, the term of this patent is extended or adjusted under 35 U.S.C. 154(b) by 470 days.

(21) Appl. No.: 12/910,151

(22) Filed: Oct. 22, 2010

(65) Prior Publication Data

US 2011/0103098 A1 May 5, 2011

Related U.S. Application Data

(60) Provisional application No. 61/256,665, filed on Oct. 30, 2009.

(51) Int. Cl.
*H02M 3/335* (2006.01)
*H02M 1/36* (2007.01)
*H02M 3/337* (2006.01)
*H02M 1/32* (2007.01)

(52) U.S. Cl.
CPC ............ *H02M 3/33592* (2013.01); *H02M 1/36* (2013.01); *H02M 3/3376* (2013.01); *H02M 2001/322* (2013.01); *Y02B 70/1433* (2013.01); *Y02B 70/1475* (2013.01)

(58) Field of Classification Search
CPC .......... Y02B 70/1433; Y02B 70/1491; H02M 3/33507; H02M 2001/0058; H02M 3/33592
USPC ............................................. 363/21.02, 21.03
See application file for complete search history.

(56) References Cited

U.S. PATENT DOCUMENTS

| | | | |
|---|---|---|---|
| 5,712,772 A * | 1/1998 | Telefus et al. .............. | 363/21.02 |
| 6,344,979 B1 | 2/2002 | Huang et al. | |
| 2007/0024254 A1 * | 2/2007 | Radecker et al. ............. | 323/247 |

FOREIGN PATENT DOCUMENTS

| | | |
|---|---|---|
| CN | 101689811 A | 3/2010 |
| CN | 101803164 A | 8/2010 |
| TW | M301461 U | 11/2006 |
| TW | M340660 U | 9/2008 |
| TW | I309498 B | 5/2009 |
| TW | 200939608 A | 9/2009 |

OTHER PUBLICATIONS

Ma, Hao et al., An Improved Design Method for Resonant Tank Parameters of LLC Resonant Converter, Proceedings of the CSEE, 2008, p. 6-11, vol. 28, No. 33.

(Continued)

*Primary Examiner* — Jue Zhang
(74) *Attorney, Agent, or Firm* — Tim Tingkang Xia; Locke Lord LLP

(57) ABSTRACT

An approach is provided for limiting or eliminating residual energy in a resonant network before restarting a resonant converter including the resonant network. An energy resetting module is configured to the resonant converter for limiting a peak current occurring in a switching circuit of the resonant converter by resetting energy remaining in a resonant circuit of the resonant converter after the resonant converter is turned off.

11 Claims, 15 Drawing Sheets

(56) References Cited

OTHER PUBLICATIONS

Ming Ming Tang, LLC resonant converter based on DSP, Central South University, Changsha, China.

Ma Hao et al., An Improved Design Method for Resonant Tank Parameters of LLC Resonant Converter, Proceedings of the CSEE, 2008, 6-11, vol. 28, No. 33.

* cited by examiner

Cr/Lr has initial condition

With input, no initial conditions

With initial conditions, no input.

t0 and t1 are the same time t2 and t3 are the same time

800

820

900

METHOD AND APPARATUS FOR RESETTING A RESONANT CONVERTER

RELATED APPLICATIONS

This application claims the benefit of the earlier filing date under 35 U.S.C. §119(e) of U.S. Provisional Application Ser. No. 61/256,665 filed on Oct. 30, 2009, entitled "Resetting Resonant Energy By MOS Linear Operation", the entirety of which is incorporated herein by reference.

BACKGROUND

Because of environmental and energy consumption concerns, consumers are demanding more energy efficient products. Electronic designers are applying soft switching topologies to improve the efficiency of electronic and electrical products and to enable higher frequency operations in these products. However, switching loss has been an obstacle to power conservation, especially during high frequency operations. As such, resonant converters may be used to apply a zero-voltage switching technique to reduce switching loss occurring during turn-on or turn-off transitions of electronic devices, thereby allowing operations of higher switching frequencies than comparable converters. Resonant converters contain switching elements and resonant LC networks whose voltage or current waveforms vary sinusoidally during one or more subintervals of each switching period.

A basic switching element is an electronic component encompassing a diode and a transistor (typically a power metal-oxide-semiconductor field-effect transistor (MOSFET)) connected in parallel. In particular, a resonant converter switches the switching element when it is at the zero current or zero voltage point, which reduces the stress on the switching element and the radio interference. The zero-voltage switching (ZVS) is achieved by forcing the current flowing through the switch element to reverse its flow. When the switch current is reversed, the body diode of the switching element clamps the voltage of the switching element to a low value. This minimizes the overall energy loss within the circuitry.

Resonant converters are usually controlled by varying the switching frequency of the switching elements. Examples of the resonant converters include DC-to-high-frequency-AC inverters, resonant DC-DC converters, resonant inverters or rectifiers producing line-frequency AC, resonant AC-DC converters, resonant AC-AC converters, etc. Common applications, for instance, include personal computers, servers, telecom systems, mobile phones, automobiles, medical equipment, gaming consoles and industrial equipment, and so on.

In some instances, the switching element is turned on by a large peak current occurring during a restart process of the resonant converter. The large peak current can damage the switching element. This peak current is caused by energy remaining in a resonant network of the resonant converter after the resonant converter is turned off.

SOME EXAMPLE EMBODIMENTS

Therefore, there is a need to limit or eliminate the residual energy in the resonant network before restarting the resonant converter.

According to one embodiment, a method comprises turning off a resonant converter. The method also comprises limiting a peak current occurring in a switching circuit of the resonant converter by resetting energy remaining in a resonant circuit of the resonant converter.

According to another embodiment, an apparatus comprises a switching circuit and a resonant circuit. The apparatus also comprises a control module coupled to the switching circuit and configured to output to the switching circuit after the apparatus is turned off, for limiting a peak current occurring in the switching circuit by resetting energy remaining in the turned-off apparatus.

According to yet another embodiment, a resonant converter comprises a switching circuit coupled to an input voltage, a resonant circuit coupled to the switching circuit, a transformer coupled to the resonant circuit, and a rectification circuit coupled to the transformer. The resonant converter also comprises a driver coupled to the switching circuit and configured to output to the switching circuit after the resonant converter is turned off, for limiting a peak current occurring in the switching circuit by resetting energy remaining in the turned-off resonant converter.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method and apparatus for resetting a resonant converter are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
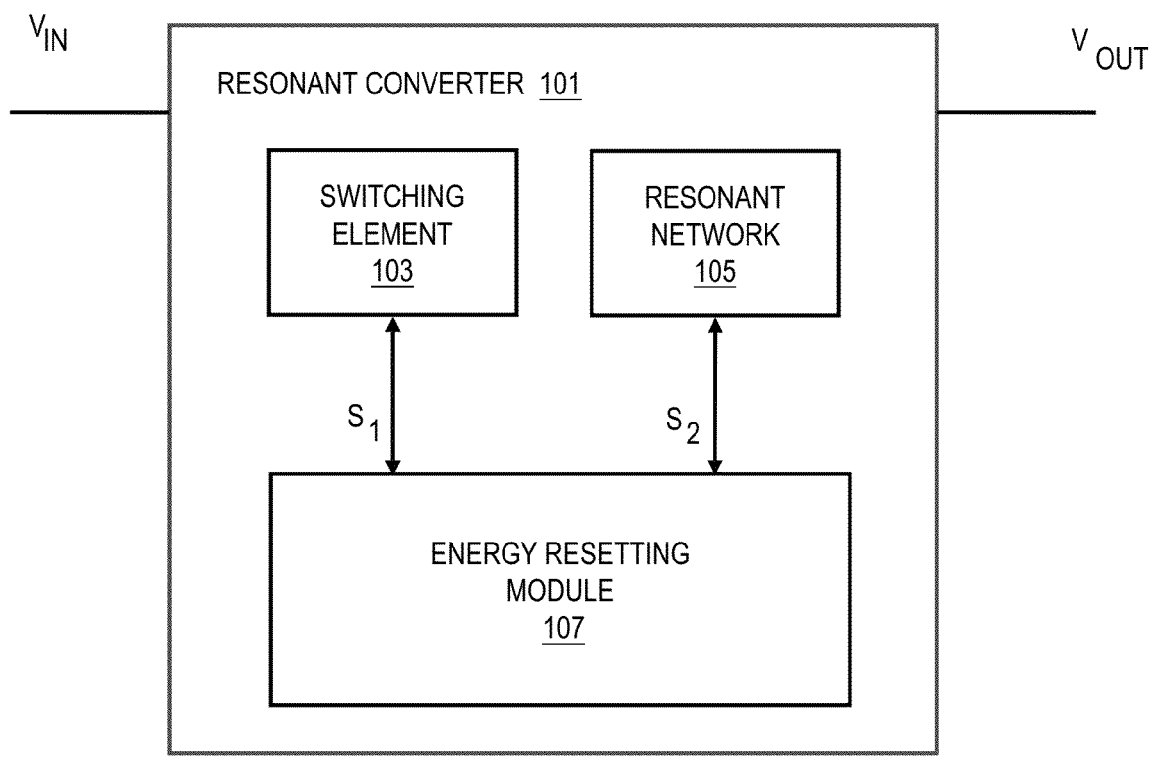
FIG. 1 is a block diagram depicting a resonant converter configured with an energy resetting module for consuming DC bias within a switching element before restarting the resonant converter, in accordance with an exemplary embodiment.

FIG. 1 is a block diagram depicting a resonant converter configured with an energy resetting module for consuming DC bias within a switching element before restarting the resonant converter, in accordance with an exemplary embodiment. A resonant converter 101 is a form of power converter that is useful for electronic applications requiring efficient switching of power within a circuit while achieving limited power loss. The resonant converter 101, in one embodiment, includes a switching element 103, a resonant network 105, and an energy resetting module 107. The resonant converter 101 uses circuit capacitances and inductances of the resonant network 105 to shape the waveform of either the current or the voltage being driven across a given switching element 103, e.g., a transistor coupled to a diode. The voltage or current waveforms of the resonant network 105 vary sinusoidally during one or more subintervals of each switching period. As a result, an input voltage Vin is converted into output voltage Vout. The resonant network 105 is also known as a resonant circuit or a resonant tank. Ideally, when the resonant converter 101 restarts, there is no current through or voltage across the switching element 103, as the applied energy is absorbed accordingly. However, as mentioned, there may be energy remaining in the resonant network 105 after turning off the resonant converter 101. The energy resetting module 107 is provided to reset the energy remaining in the resonant network 105 in order to limit a peak current occurring in the switching element 103 before turning on the resonant converter 101. Optionally, the energy resetting module 107 outputs driving signals S1, S2 to the switching element 103 and/or the resonant network 105.

Figure 2A:
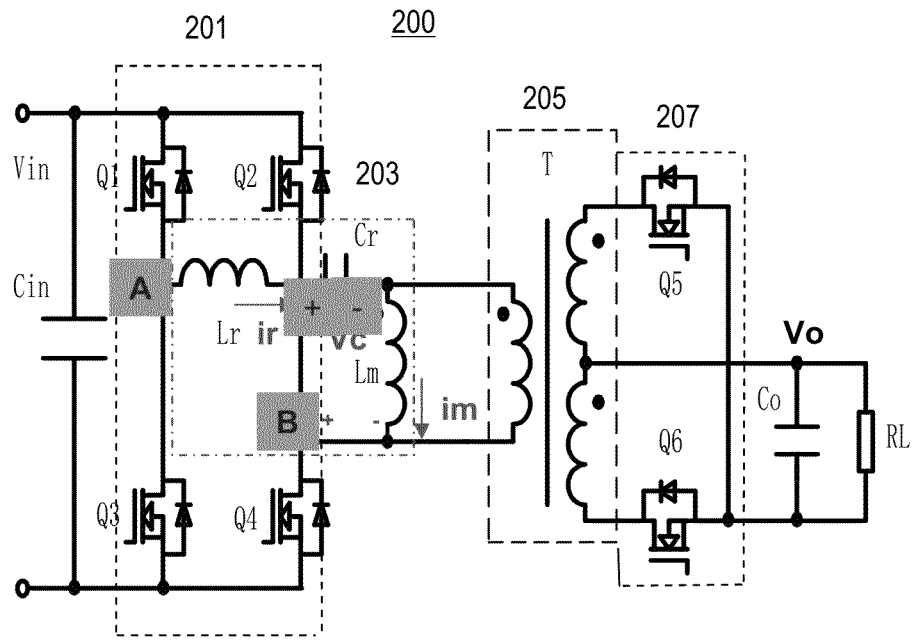
FIGS. 2A-2C show a circuit diagram and waveforms of a LLC series resonant converter to be controlled by an energy resetting module, in accordance with an exemplary embodiment.

FIG. 2A is a circuit diagram depicting a LLC series resonant converter to be controlled by an energy resetting module, in accordance with an exemplary embodiment. As shown in FIG. 2A, the LLC series resonant converter 200 includes a switching circuit 201 formed by power switches Q1-Q4, a resonant network 203, a transformer T 205, and a rectification circuit 207. Here, LLC represents a resonant circuit comprising a resonant inductor Lr, a resonant capacitor Cr, and a magnetizing inductor Lm connected in series. The resonant converter 200 also includes an input capacitor Cin. The transformer 205 isolates the switching circuit 201 and the resonant network 203 from a rectification circuit 207 by a primary side winding and two series secondary sides windings, coupled in series. In one embodiment, the rectification circuit 207 includes a pair of synchronous rectification switches Q5-Q6 connected to an output capacitor Co and a load RL. In FIG. 2A, the switches Q5, Q6 are implemented using MOSFETs, for example. The source terminals of Q5 and Q6 are connected to the cathode of the capacitor Co. The drain terminal of Q5 is connected to the positive terminal of the secondary side coil, whereas the drain terminal of Q6 is connected to the negative terminal of the secondary side coil. A common connection node between the coils is connected to the anode of Co and a positive terminal of an output voltage Vo.

The resonant converter 200 receives an input voltage Vin, and generates an output voltage Vo. The resonant converter 200 has a parametric design and operating ranges to ensure that the power switches Q1-Q4 operating under a zero voltage switching (ZVS) condition, and even causing, at the same time, the rectification switches Q5-Q6 to perform zero current switching (ZCS). The ZVS exploits the circuit elements to guarantee zero voltage across the switches Q1-Q4 before turn on, thereby eliminating power losses due to the simultaneous overlap of switch current and voltage at each transition. When the power transistors Q1-Q4 are enabled, the voltage across them should be zero, yielding minimal switching loss.

Figure 2B:
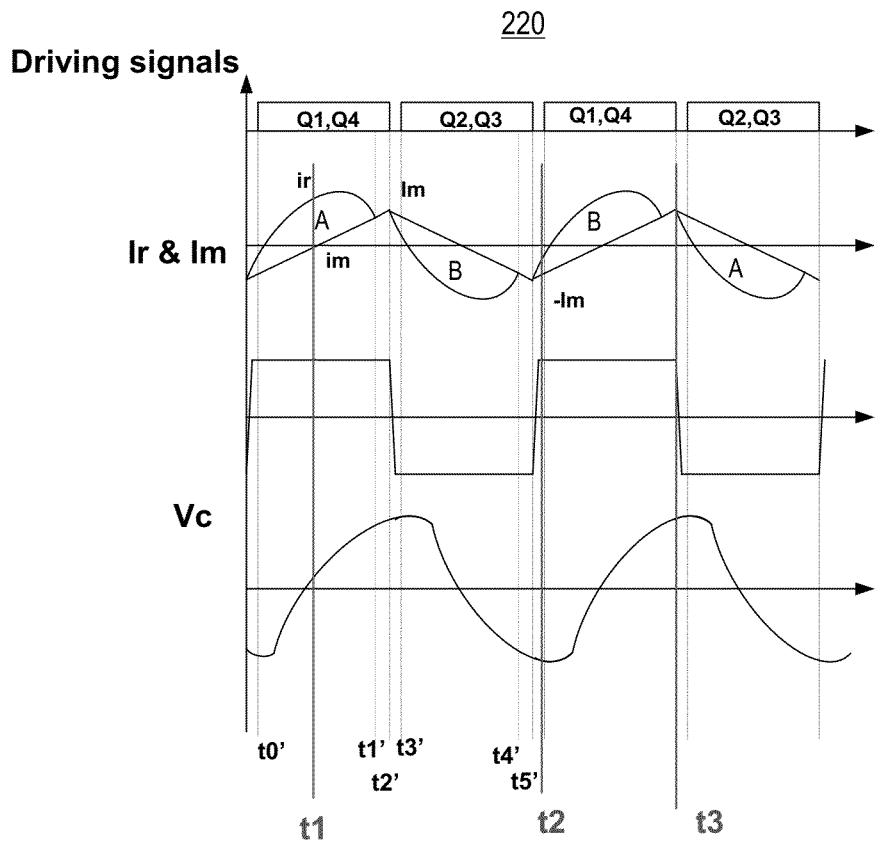

FIG. 2B shows waveforms of the resonant converter 200 operating under a normal operation, in accordance with an exemplary embodiment. In FIG. 2B, S1 indicates a driving signal of switches Q1 and Q4, S2 indicates a driving signal of switches Q2 and Q3, Ir and Im are currents flowing through the resonant inductor Lr and the magnetizing inductor Lm, respectively. Im has the values of Im and −Im respectively when switches Q1 and Q2 are turned off. Vc is the voltage across the resonant capacitor Cr. And the reference directions of Ir, Im and Vc are shown in FIG. 2A. The difference between Ir and Im is the primary side current of the transformer T. In the region A and B, energy transfers from the primary side to the secondary side. In the mean time, the magnetizing current Im is kept at substantially the same level during a light-load condition as that during a heavy-load condition.

At time t0', the power switches Q1/Q4 opens under the ZVS condition because the primary side current Ir is opposite to its reference direction. During the interval between t0' and t1', the rectification switch Q6 is conducted with current; therefore the voltage on the magnetizing inductor Im is constant and does not take part in the resonance, so the magnetizing current Im increases linearly. Due to the resonance between Lr and Cr, current IQ6 through Q6 appears in a quasi-sine waveform. At time t1', Q6 is off because the switching period is longer than the resonant period between Lr and Cr, which causes Ir to descend down to Im before Q1/Q4 is shut off. And then Cr, Lr and Lm take part in the resonance. For the purpose of simplifying the analysis, Lm>>Lr is assumed; therefore Ir is approximately a straight line between t1'-t2'. At time t2', Q1/Q4 are turned off. At time t3', Q2/Q3 are switched on under ZVS condition. During the intervals from t3' to t4' and from t4' to t5', a similar analysis can be applied. The operation status and the waveform of the current IQ5 are similar to IQ6 when interacting with the switches Q2/Q3. IQ5 and IQ6 compose the output rectification current. The waveforms 220 in FIG. 2B also show three shut down time points t1, t2, and t3 when the resonant converter is turned off. The resonant converter may be turned off at any time point.

In FIG. 2A, the switches Q1-Q4 generate a square wave and apply it to the resonant circuit 203 via points A, B. If the operating point is set at resonance, the current flowing into the resonant circuit 203 is approximately sinusoidal, as the higher-order components are generally well attenuated. The sinusoidal current waveform lags the voltage waveform between the points A, B. So when the voltage waveform reaches its zero crossing point, the current is still negative, allowing zero-voltage switching.

Figure 2C:
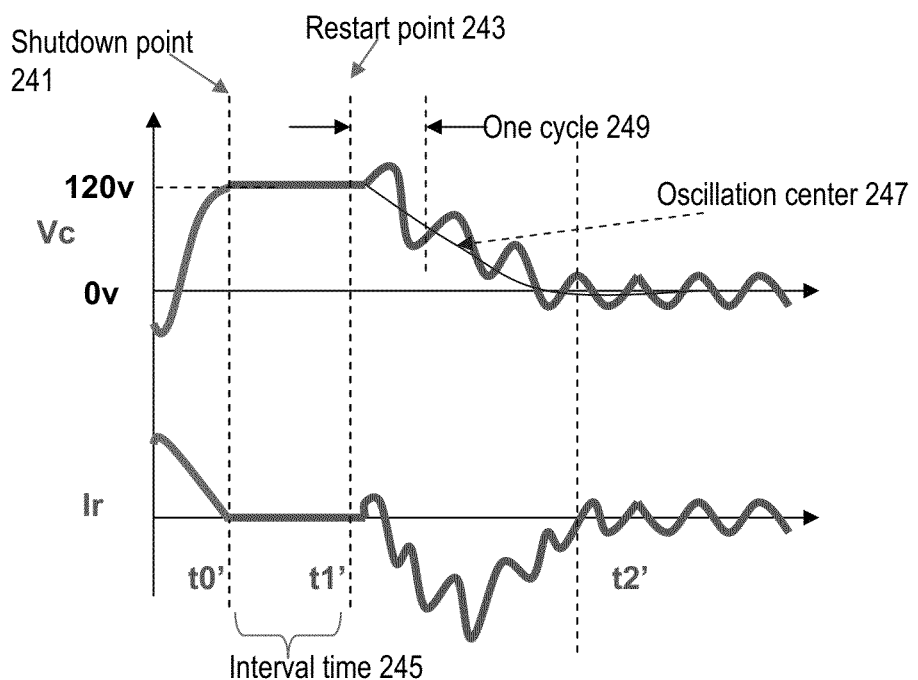

FIG. 2C shows enlarged operating waveforms 240 of a voltage of the resonant capacitor and a current of the resonant inductor of the resonant converter 200, in accordance with an exemplary embodiment. After the resonant converter 200 turns off at t0' (a shut down time point 241), the resonant converter 200 restarts at t1' (a restart time point 243). This shunt-down scenario may be triggered to protect the circuit. Thereafter, the resonant converter can restart right away, i.e., t0'=t1', such that an interval time 245 is zero. While the normal restart process has a short interval time (t1'>t0'). After t1', the voltage Vc of the resonant capacitor Cr oscillates along an oscillation center 247 and attenuates from a predetermined value, e.g. 120 v to 0 v, during several working cycles. FIG. 2C marks a first working cycle 249. As shown in FIG. 2C, whenever the resonant converter 200 is turned off (e.g., at the time t0'), there is residual energy left in the resonant network 203. This residual energy stored in Cr and/or Lr can not be quickly consumed. Therefore, the resonant current Ir has a DC bias. If the converter 200 restarts during the interval t1'-t2', the switches Q1/Q4 or Q2/Q3 thus switch with the DC bias of Ir. Significant currents circulate through the switches Q1-Q4. The resulted high current peak values increase conduction losses and may possibly damage the switches Q1-Q4. Thus, there is a need to resolve this specific problem before restarting the resonant converter 200.

Figure 3A:
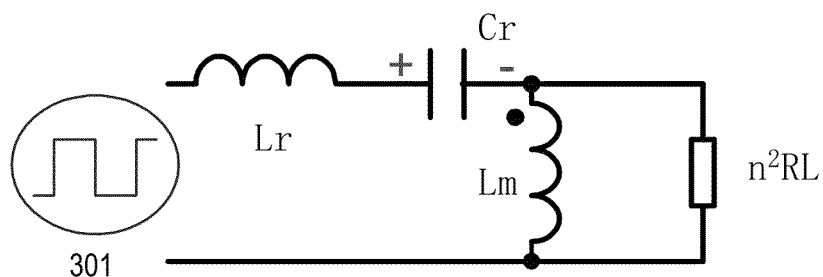
FIG. 3A shows equivalent diagrams depicting the resonant network, in accordance with an exemplary embodiment.
Figure 3A:
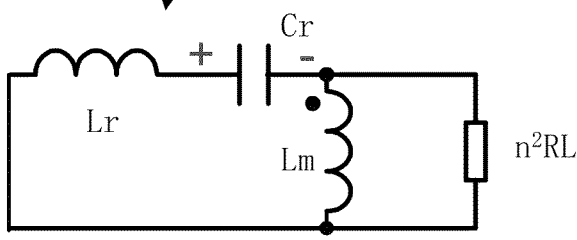

FIG. 3A shows equivalent circuit diagrams depicting the resonant network, in accordance with an exemplary embodiment. An equivalent circuit 300 of the resonant network 203 is created for analyzing the operations of the resonant network 203 during the interval between t1 and t2. The circuit 300 has an input 301 of a symmetrical square wave of a predetermined value (e.g., +/−400 v) generated by the switching circuit 201. To simulate the operations of the resonant network 203, the equivalent circuit 300 is further divided into two equivalent circuits 310 and 320. The circuit 310 has an input 311 of a symmetrical square wave but no initial voltage Vcr of the resonant capacitor and initial current Ir of the resonant inductor. On the other hand, the circuit 320 has initial Vcr or Ir, but no input source. In the circuit 320, the initial voltage Vcr and the initial current Ir are reset during the switching operation. The total resonant current includes the reset current of the circuit 320 and a switching current of the circuit 310.

Figure 3B:
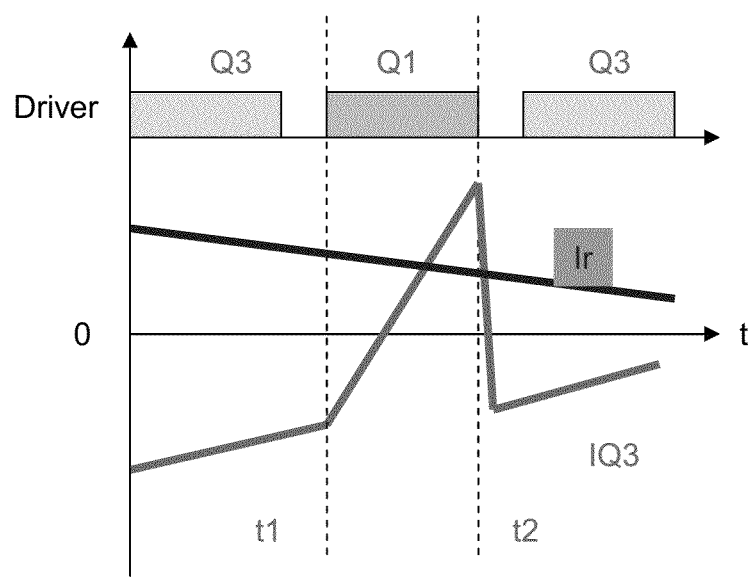
FIG. 3B shows waveforms of the voltage of the resonant capacitor and the current of the resonant inductor of the resonant converter, in accordance with an exemplary embodiment.

The circuits 310 and 320 are simulated with a commercially available toolbox, such as SIMULINK in MATLAB, to provide simulated waveforms of the voltage Vcr and the current Ir. In this simulation, the resonant convertor 200 restarts at t1'. FIG. 2C shows waveforms 240 of the voltage Vcr of the resonant capacitor and the current Ir of the resonant inductor of the resonant converter 200, in accordance with an exemplary embodiment. After t1', the Vcr oscillation center recovers from a predetermined value (e.g., 120 v to 0 v), and Ir has a DC bias during this process. Due to the DC bias of Ir, the switches Q1-Q4 endure capacitive switching. FIG. 3B shows this kind of scenario. By way of example, Q1 is turned on with Ir flowing through Q3's body diode. The capacitive switching results in large short through current and loss, which may damage the switches Q1-Q4. Such capacitive switching result in large current flows through Q3 and Q1 due to high reverse recovery of an intrinsic body diode of the Q3 switch. An extremely low reverse voltage on the Q3 switch, occurring at no or low load operation, is insufficient to guarantee the reverse recovery charge sweep out before turning Q3 off. Under this condition, high dv/dt values could turn on the intrinsic body diode and destroy Q3. As shown in FIG. 3B, the simulated peak current value of IQ3 could substantially increase over a short period of time (e.g., over 20A).

Figure 4A:
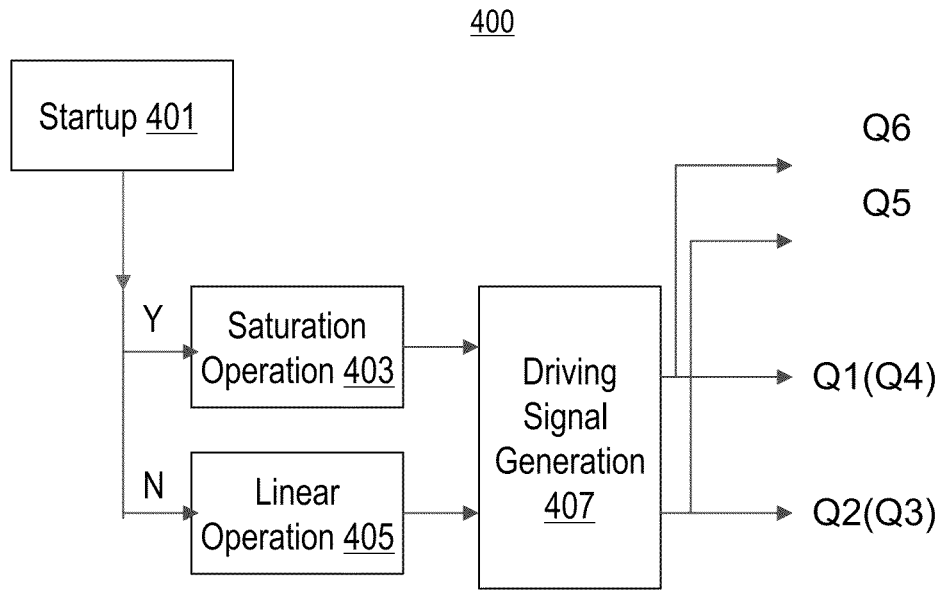
FIGS. 4A-4G show operational diagrams of a resonant converter resetting system, in accordance with various embodiments.
Figure 4B:
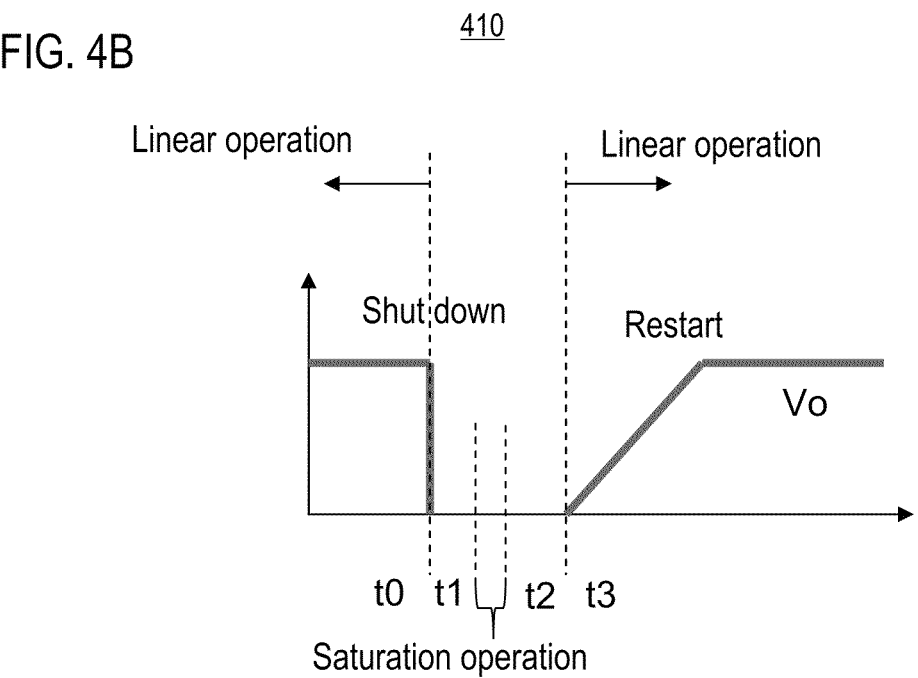

To address this problem, a driving process 400 of the energy resetting module 107 is introduced to reset the resonant network energy before restarting the resonant converter 200. FIG. 4A shows an operational diagram of the process 400, in accordance with an exemplary embodiment. In particular, the driving process 400 starts from a startup 401 and determines whether the resonant converter 200 is shutting down or not. If the resonant converter 200 is not shutting down (e.g., before t0), the driving process 400 makes the converter operate in a linear operation 405. If the converter is shutting down (e.g., during the interval t1-t2), the driving process 400 makes the converter operate in a saturation operation 403 to consume the resonant energy. Thereafter, a process 407 begins to generate and send the driving signals S1, S2 to Q1-Q4 subsequent to the process 403 or 405. FIG. 4B shows an operational diagram 410 corresponding to the process 400, in accordance with an exemplary embodiment. The switches Q1-Q4 operate in a saturation mode during the saturation operation 403 (t1-t2), while operating in a linear mode during the liner operation 405 (<t0, and >t3).

Figure 4C:
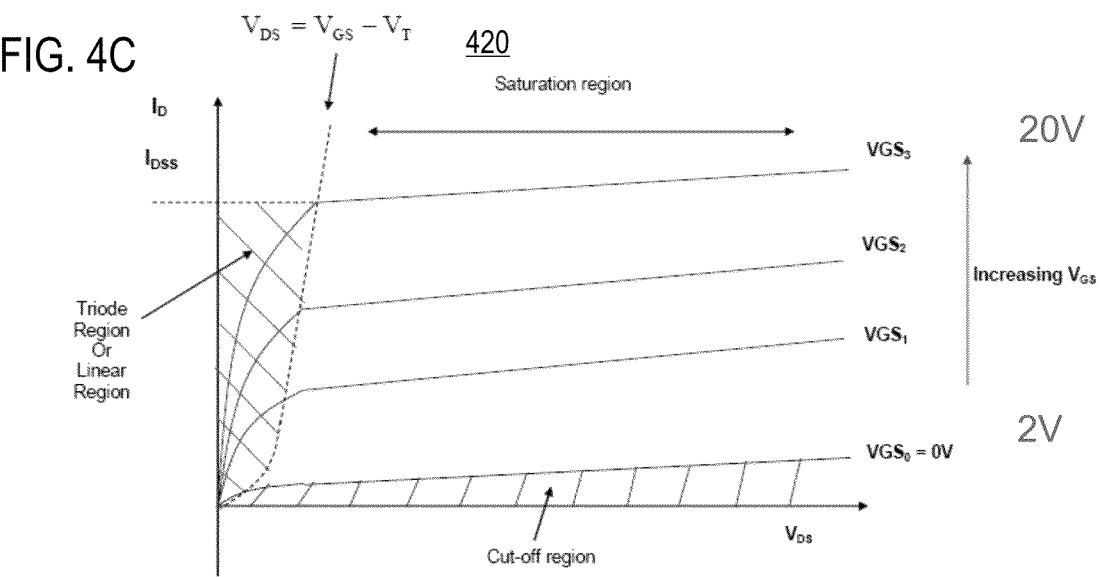

FIG. 4C is an operational mode diagram 420 of a power switch (e.g., a MOSFET) in the different drain current ($I_D$) vs. drain-to-source voltage ($V_{DS}$) modes, according to various embodiments. The boundary between the linear (Ohmic) mode and the saturation (active) mode is indicated by an upward curving parabola ($V_{DS}=V_{GS}-V_T$). In the linear mode, the MOSFET is turned on, and a channel has been created which allows current to flow between the drain and the source. The MOSFET thus operates like a small resistor (e.g., several~several hundred mOhm), controlled by the gate voltage relative to both the source and drain voltages.

Linear mode: when $V_{GS}>V_{th}$ and $V_{DS}<(V_{GS}-V_{th})$.

In the saturation mode, the MOSFET is turned on, and a channel has been created, which allows current to flow between the drain and the source. And during the saturation mode, the MOSFET operates like a rheostat controlled by a gate voltage, which has a very large resistance (e.g., several~several hundred or kilo Ohm).

Saturation mode: when $V_{GS}>V_{th}$ and $V_{DS}>(V_{GS}-V_{th})$

Figure 4D:
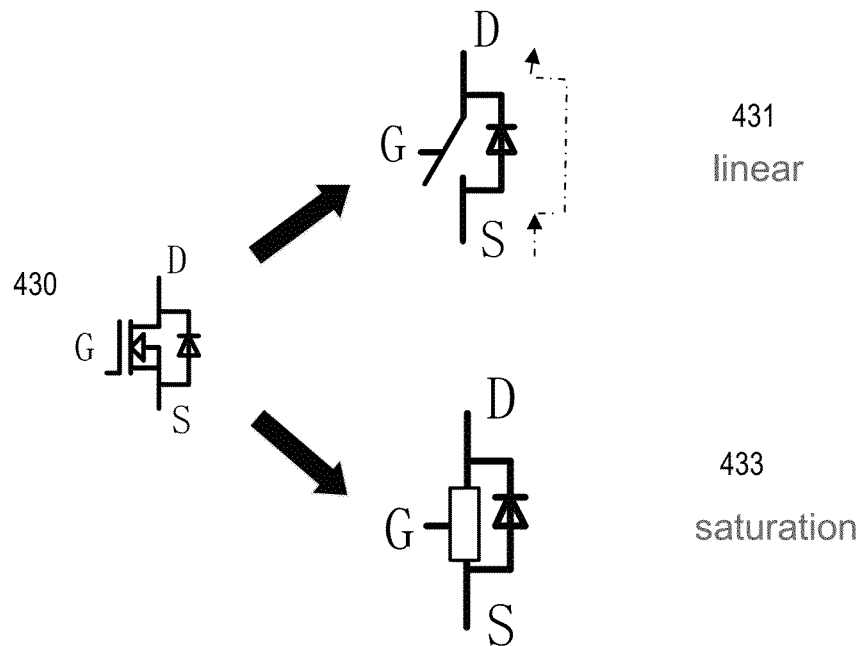
Figure 4E:
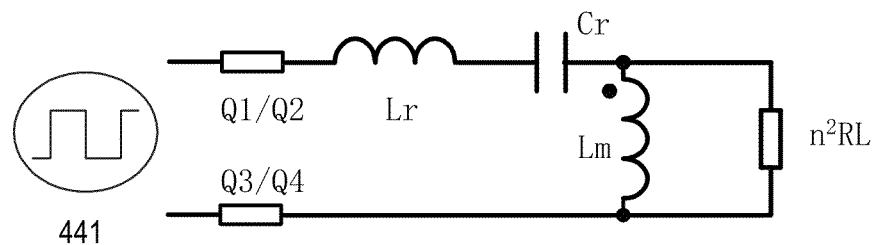

FIG. 4D shows the operation modes of any one of the switches Q1-Q4 (430). In a linear (switching) mode 431, for example, Q3 is utilized as a switch controlled by a driving signal on its gate which has a small resistance (e.g., several~several hundred mOhm). In a saturation mode 433, Q3 is controlled as a rheostat by various gate voltage levels $V_{GS}$ (e.g., 2-20 V) which has a large resistance (e.g., >several ten Ohm). To simulate the operations of Q1-Q4 in the saturation mode 433, the switching circuit 201 and resonant network 203 are made into an equivalent circuit 440 that include a load Q1/Q2, a load Q3/Q4, and a load n²RL as shown in FIG. 4E, wherein the load Q1/Q2 or Q3/Q4 represents the operation of Q1-Q4 in the saturation mode. The equivalent circuit 440 has an input 441 of a symmetrical square wave generated by the switching circuit 201. During the saturation mode, Q1-Q4 operate as large resistors controlled by $V_{GS}$ instead of operating as switches. Therefore, the saturation mode limits current flowing through Q1-Q4, and consumes the resonant energy like resistors. The process 400 thus prevents the above-discussed current peak issue between the source and drain of the switches.

Figure 4F:
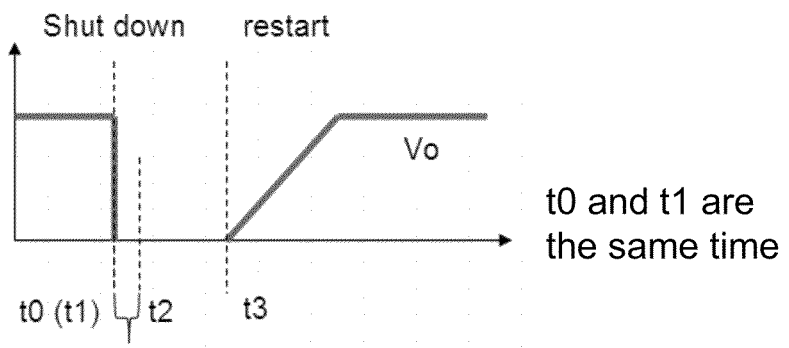
Figure 4G:
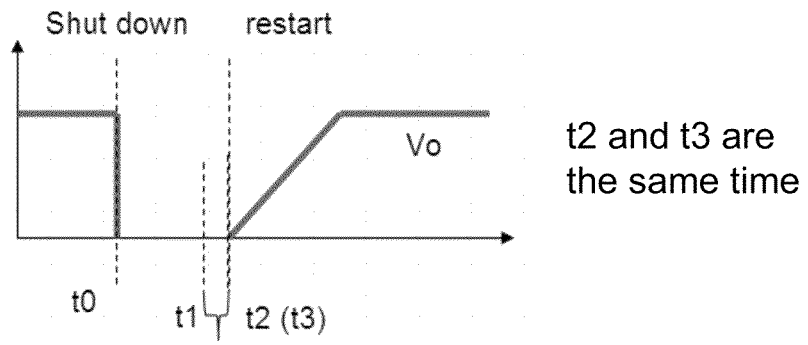

The saturation operation 403 during the interval t1-t2 can occurs at any time after the shutting down time t0 and before the restart time t3. FIG. 4F shows an operational diagram 450 of the system 400 where t0=t1, in accordance with an exemplary embodiment. In this embodiment, the saturation operation starts immediately after the resonant converter 200 is turned off at time t0. FIG. 4G shows an operational diagram 460 of the system 400 where t2=t3, in accordance with an exemplary embodiment. In this embodiment, the saturation operation ends right before the resonant converter 200 restarts at time t3. Thereafter, the resonant converter 200 is restarted with zero initial conditions without the issue of capacitive switching.

Figure 5:
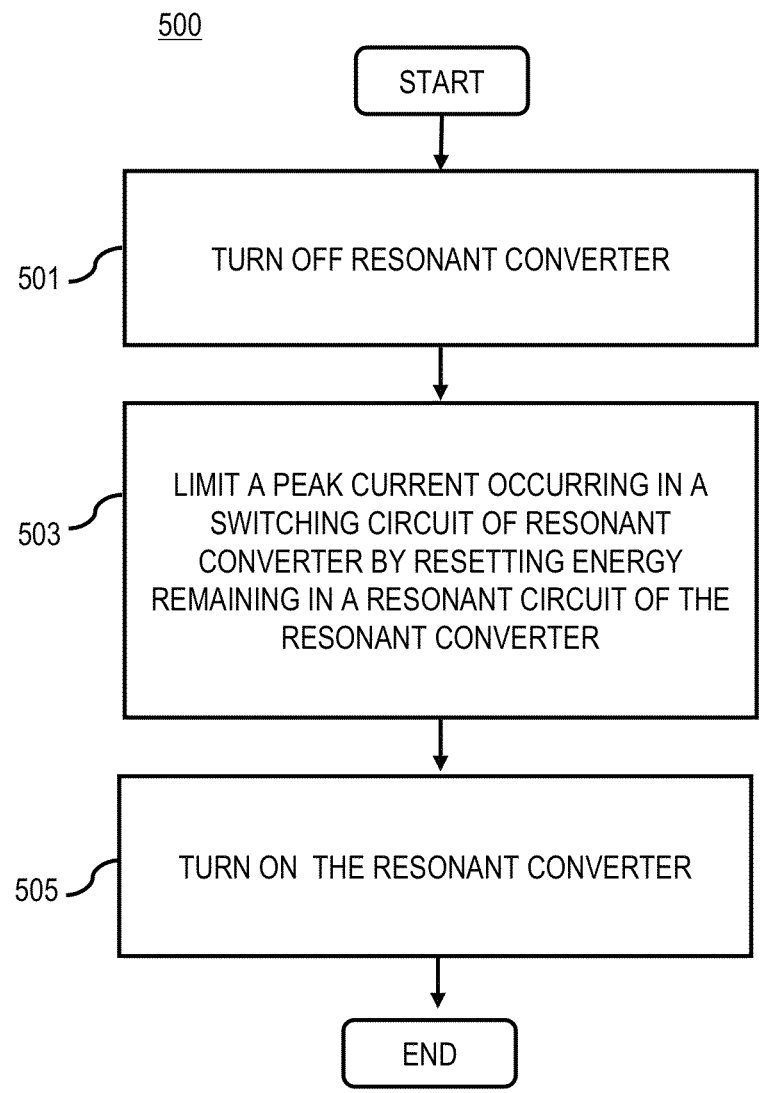
FIG. 5 is a flowchart of a process for limiting or eliminating the residual energy in a resonant network before restarting a resonant converter, in accordance with an exemplary embodiment.
Figure 8A:
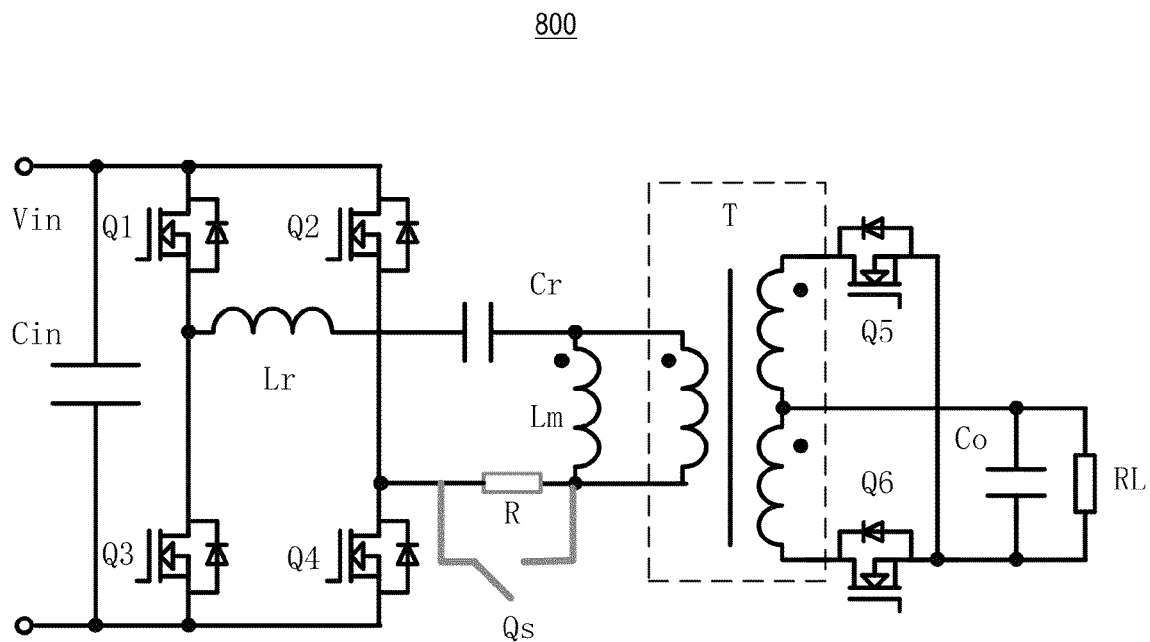
FIGS. 8A-8B show a circuit diagram and waveforms of a resonant converter resetting system including a series resonant converter, in accordance with an exemplary embodiment.

FIG. 5 is a flowchart of a process 500 for limiting or eliminating the residual energy in the resonant network before restarting the resonant converter, in accordance with an exemplary embodiment. This process 500, by way of example, can be performed by the energy resetting module 107. By way of example, in step 501, the energy resetting module 107 turns off a resonant converter. In step 503, the energy resetting module 107 limits a peak current occurring in a switching circuit of the resonant converter by resetting energy remaining in a resonant circuit of the resonant converter. The energy resetting module 107 resets the energy by activating one or more resistors in the resonant converter to consume the energy. In one embodiment, the one or more resistors to be activated in the resonant converter comprise one or more switching elements (e.g., Q1-Q4) of the switching circuit operating in a saturation mode. The one or more switching elements of the switching circuit can be made (e.g., by a driver) to operate in a saturation mode by providing a shorter driving duty of the switching circuit in a saturation operation than in a normal operation. The one or more switching elements of the switching circuit can also be made to operate in a saturation mode by reducing a driving voltage to the switching circuit in a saturation operation to be lower than in a normal operation. In another embodiment, one or more resistors in the resonant circuit are activated to consume the energy. And FIG. 8A shows one example. In step 505, the energy resetting module 107 turns on the resonant converter, after resetting the energy remaining in the turned-off resonant circuit.

Figure 6A:
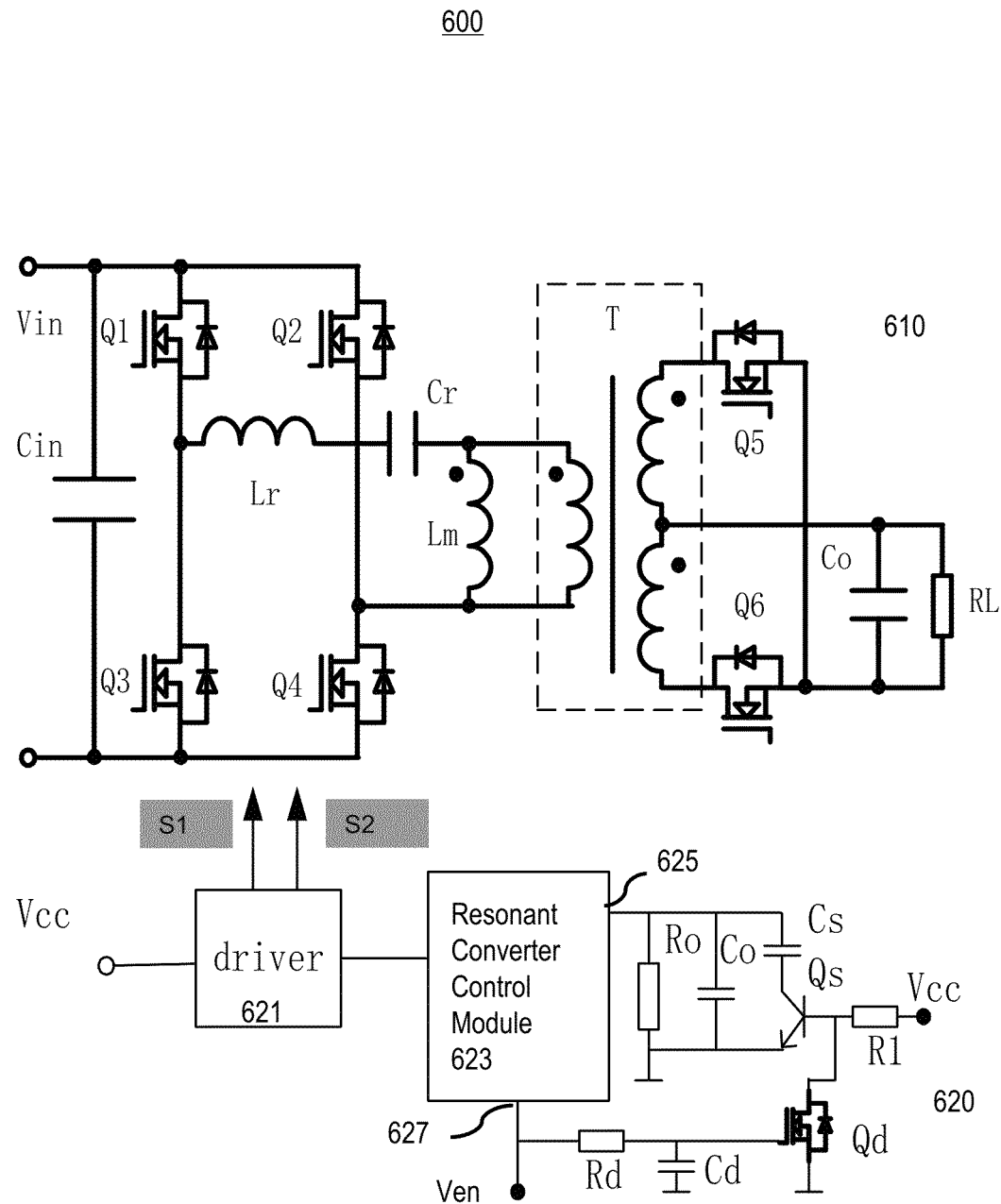
FIGS. 6A-6C show a circuit diagram and waveforms of a resonant converter resetting system including a resonant converter and a driving system, in accordance with an exemplary embodiment.

The above-mentioned processes cause the switches Q1-Q4 to operate in the saturation mode during the interval t1-t2 are discussed in detail as follows. FIG. 6A shows a circuit diagram of a resonant converter resetting system 600 including a series resonant converter and an energy resetting module, in accordance with an exemplary embodiment. The series resonant converter 610 has the same components as the resonant converter 200 in FIG. 2A. The energy resetting module 620 operates under the same processes as the embodiments depicted in FIGS. 4A-4G. The energy resetting module 620 has a driver 621 for supplying driving signals S1 to drive Q1 (Q4), S2 to drive Q2 (Q3), a resonant converter control module 623, and an auxiliary power supply Vcc. Before starting up the series resonant converter 610, the energy resetting module 620 utilizes a small driver duty to realize the Q1-Q4 saturation operation. In particular, the energy resetting module 620 manipulates a one-shot pin 625 of the control module 623 to control a dead time, and an enable pin 627 of the control module 623 to select the Vcc threshold voltages. By way of example, MC33607 made by ON SEMICONDUCTOR® is used as the resonant converter control module 623.

Figure 6B:
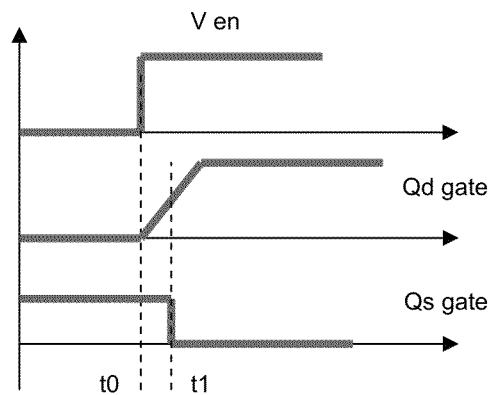

FIG. 6B shows waveforms 630 of components of the energy resetting module 620, in accordance with an exemplary embodiment. After the series resonant converter 610 shutting down at time t0, an enable voltage Ven is supplied into the control module 623 via the enable pin 627. The enable pin 627 is connected to a gate of a switch Qd via a resistor Rd and a capacitor Cd. The auxiliary power supply Vcc is connected to Qd and Qs in parallel via a resistor R1.

The one shot pin 625 is designed to disable both outputs S1, S2 simultaneously to provide a dead time before either output S1, S2 to Q1-Q4 is enabled. The one shot pin 625 is connected to the ground via a resistor Ro, a capacitor Co, and a capacitor Cs (in turn connecting to Qs) in parallel.

FIG. 6B shows the waveforms of an enabling voltage, the switch Qs, and a switch Qd, in accordance with an exemplary embodiment. During the linear operation, the one-shot period is adjusted to provide a normal deadtime and to activate the output switch of S1, S2 while the primary current is slewing but before the current changes polarity. For the zero-voltage resonant mode, the converter switching period is set as equal to or more than the one shot period.

Figure 6C:
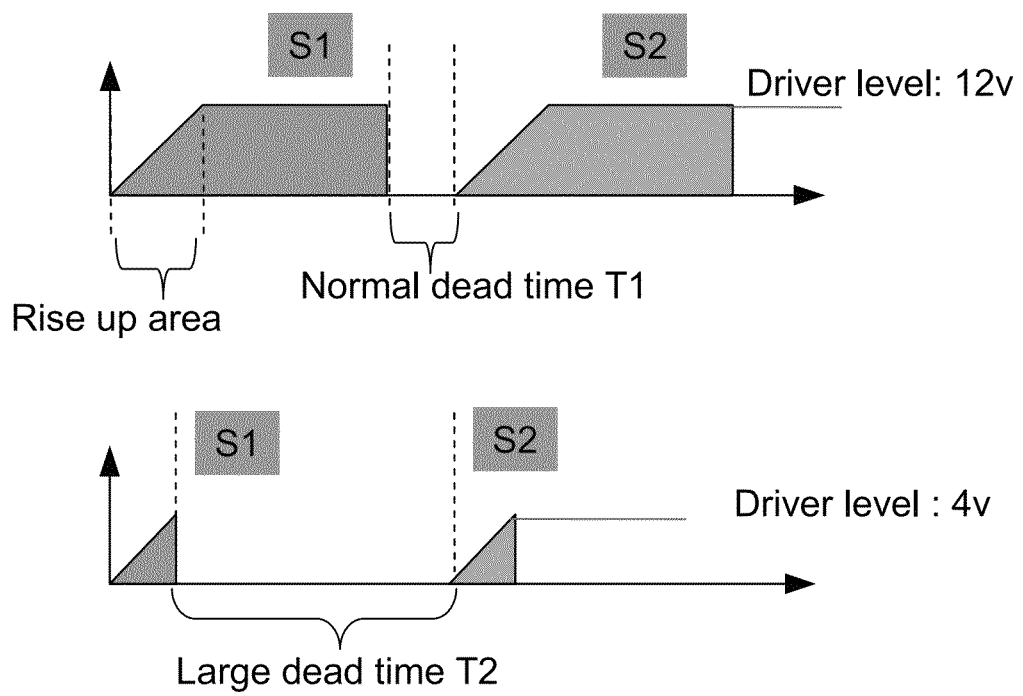

To drive the switches Q1-Q4 into a saturation mode, Qs turns on during the interval t0-t1, Ro and Co//Cs determines a dead time T2 that is larger than a normal deadtime T1. FIG. 6C shows gate voltage waveforms 640 of the switches Q1-Q4 of the series resonant converter 610 operating under different deadtimes, in accordance with an exemplary embodiment. The large dead time T2 prevents the driver output S1, S2 to rise up to a normal voltage level (e.g., 12 v). Therefore, a lower driver voltage (e.g., ~4 v) causes Q1-Q4 to enter into the saturation mode. After t1, Qs turns off, Ro and Co determine the normal dead time T1. The normal dead time allows the driver output S1, S2 to the switches Q1-Q4 to rise up to a normal voltage level (e.g., 12 v). As simulated, the current IQ1 of the switch Q1 of the series resonant converter 610 has a small peak current e.g., a peak current value smaller than 10A, due to the large dead time T2 (i.e., a small driver duty). In other words, the above described embodiment reduces the peak current IQ1 from a higher one (e.g., more than 20A) to a lower one (e.g., less than 10A) by deploying a larger deadtime.

Figure 7A:
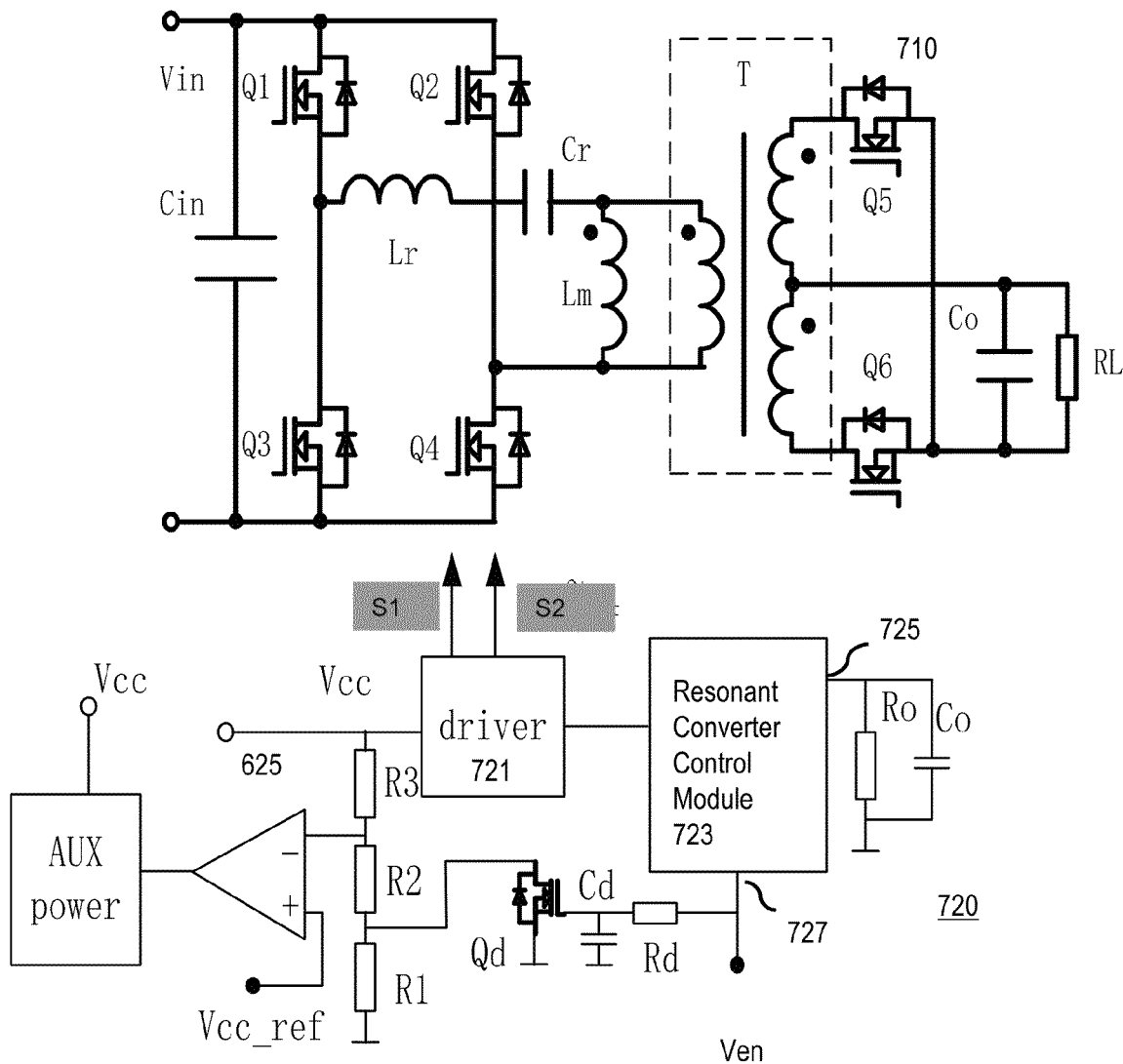
FIGS. 7A-7C show a circuit diagram and waveforms of a resonant converter resetting system including a series resonant converter and a driving system, in accordance with an exemplary embodiment.

FIG. 7A shows a circuit diagram of a resonant converter resetting system 700 including a series resonant converter and an energy resetting module, in accordance with an exemplary embodiment. The series resonant converter 710 has the same components as the resonant converter 200 in FIG. 2A. The energy resetting module 720 operates under the same processes as the embodiment depicted in FIGS. 4A-4G. The energy resetting module 720 has a driver 721 for supplying driving signals S1 to drive Q1 (Q4), S2 to drive Q2 (Q3), a resonant converter control module 723, and an auxiliary power supply Vcc. Instead of using a small driver duty as in FIG. 6, the energy resetting module 720 directly lowers down the driver voltage to make Q1-Q4 operate in the saturation mode by switching on a driver resistor R1. In particular, before restarting the series resonant converter 710, the energy resetting module 720 manipulates the driver resistor R1 to control the Vcc threshold voltages.

Figure 7B:
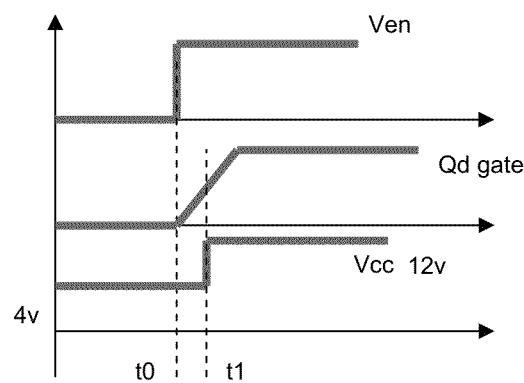
Figure 7C:
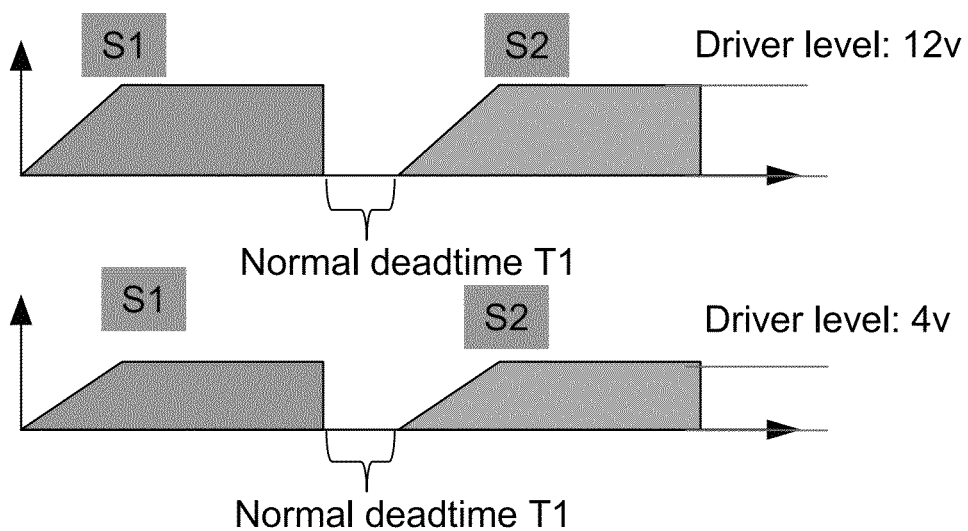

FIG. 7B shows waveforms 730 of components of the energy resetting module 720, in accordance with an exemplary embodiment. After the series resonant converter 710 shuts down at time t0, an enable voltage Ven is supplied into the control module 723 via an enable pin 727. The enable pin 727 is connected to a gate of a switch Qd via a resistor Rd and a capacitor Cd. A one shot pin 725 is connected to the ground via a resistor Ro and a capacitor Co in parallel. During the interval t0-t1, the deadtime in the saturation operation remains the same as the normal deadtime T1 in the linear operation. The auxiliary power supply Vcc is connected to an amplifier 725 via a resistor R3 as a negative input, and the reference voltage Vcc_ref is connected directly the amplifier 725 as the positive input of FIG. 7C shows waveforms 740 of switches Q1-Q4 of the series resonant converter 710 under different R1 settings, in accordance with an exemplary embodiment. Before t0, R1 turns off. As such, Vcc is thereafter determined by R2 and R3. During the interval t041, R1 turns on. Accordingly, Vcc is thereafter determined by R1, R2, and R3. By way of example:

When $R1$ is OFF$(R1=0)$, $Vcc=Vcc\_ref*(R2+R3)/R2=12$ v (1)

When $R1$ is ON, $Vcc=Vcc\_ref*(R2+R3+R1)/(R2+R1)=4$ v (2)

Since the driver voltage S1, S2 supplied to the switch Q1-Q4 during t0-t1 is only 4 v, switches Q1-Q4 operate like resistors to consume resonant tank energy. The peak current value of one of the switches, e.g., Q1, is reduced to less than 10A, due to the lower driving voltage. The above described embodiment also reduces the peak current via the switches Q1-Q4 from a larger one (e.g., more than 20A) to a smaller one (e.g., less than 10A).

Figure 8B:
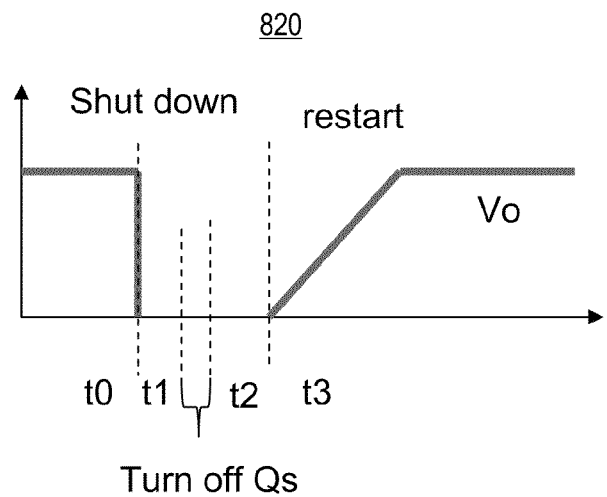

FIG. 8A shows a circuit diagram of a resonant converter resetting system including a series resonant converter 800, in accordance with an exemplary embodiment. Since this embodiment does not require particular converter driving methods, any existing driving system (not shown) can be used in conjunction with the series resonant converter 800. A large resistor is added into the series resonant converter 800 to consume the resonant tank energy. By way of example, a resistor R is added in series with the resonant tank 203, and a switch Qs is added in parallel with the resistor R. The resistor R may be composed by one or more resistors. FIG. 8B shows an operational diagram 820 of the system 800, in accordance with an exemplary embodiment. In one embodiment, the series resonant converter 800 includes a driver which includes a control module coupled to the resistor R and the switch Qs. During the interval t1-t2, either (1) Q3/Q4 are turned on while Q1/Q2 are turn off, or (2) Q1/Q2 are turned on while Q3/Q4 are turn off. Meanwhile, the switch Qs is turned off (i.e., open) by the control module, the resistor R thus consumes resonant tank energy while Q1-Q4 are in a normal operation. To restart the normal operation at t2 with a zero initial condition, Qs is turned on (i.e., close) by the control module to bypass the resistor R.

It is noted that the exemplary system and techniques discussed herein provide a convenient means for consuming the resonant tank energy of a resonant converter circuit before restarting the resonant converter. By configuring the resonant circuit 101 with an energy resetting module 107, the resonant converter is able to limit or eliminate the residual energy in the resonant network before restarting the resonant converter. Consequently, the exemplary embodiments allow for both restarting without the problem of peak current in the primary-side switches and still attain lower voltage gains/energy consumption under varying frequency ranges and design considerations.

As a result, power modules including resonant converters may be configured accordingly to generate increased output power capability with minimum modification to the circuits of the converters and the energy resetting modules.

The above described advantages may be applied to any resonant converter configuration, including, but not limited to LLC, LCC, parallel-resonant, series-resonant, and combinations thereof. Also, the processes described herein for controlling a direct current gain of a resonant converter to consuming the resonant tank energy of a resonant converter before restarting the resonant converter may be advantageously implemented via software, hardware, firmware or a combination of software and/or firmware and/or hardware. With this approach, the residual energy in the resonant network is limited or eliminated before restarting the resonant converter. The processes described herein may also be implemented with an Application Specific Integrated Circuit (ASIC), Field Programmable Gate Arrays (FPGAs), etc.

Figure 9:
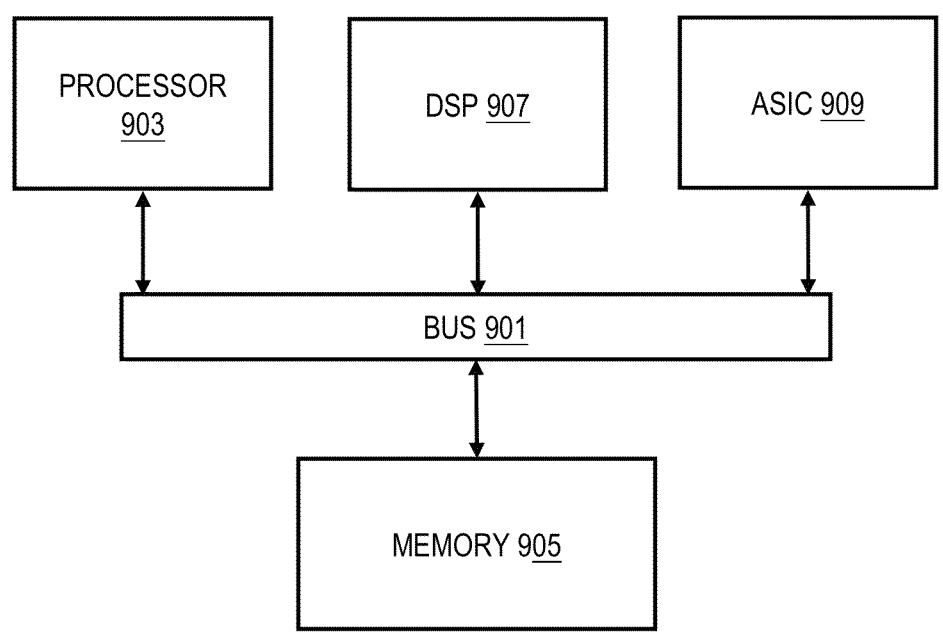
FIG. 9 is a diagram of a chip set that can be used to implement various exemplary embodiments.

FIG. 9 is a diagram of a chip set that can be used to implement various exemplary embodiments. Chip set 900 is programmed for consuming DC bias within a switching element before restarting a resonant converter to increase power efficiency within a circuit as described herein and includes, for instance, the processor and memory components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps for controlling a direct current gain of a resonant converter to increase power efficiency within a circuit.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein for controlling a direct current gain of a resonant converter to increase power efficiency within a circuit. The memory 905 also stores the data associated with or generated by the execution of the inventive steps.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
turning off a resonant converter, wherein the resonant converter comprises a switching circuit coupled to an input voltage, a resonant circuit coupled to the switching circuit, and a driver coupled to the switching circuit;
driving switches of the switching circuit to operate in a saturation mode after the resonant converter is turned off; and
limiting a peak current occurring in the switching circuit of the resonant converter by controlling a driving voltage to the switching circuit to be lower in the saturation mode than in a normal mode.

2. The method of claim 1, further comprising:
restarting the resonant converter after resetting the energy remaining in the turned-off resonant circuit.

3. The method of claim 1, wherein the switches of the switching circuit works as rheostats controlled by the driving voltage, to consume energy remaining in the resonant circuit of the turned off resonant converter.

4. The method of claim 3, wherein the resistance value of the switches of the switching circuit in saturation mode is at least ten times larger than the resistance value in normal mode.

5. An apparatus comprising:
a switching circuit;
a resonant circuit;
at least one resistor coupled in series with the resonant circuit;
at least one switch coupled in parallel with the at least one resistor; and
a control module coupled to the switching circuit and configured to:
limit a peak current occurring in the switching circuit by resetting energy remaining in the turned-off apparatus; and
turn off the at least one switch to make the at least one resistor consume energy in the resonant circuit, after the apparatus is turned off.

6. The apparatus of claim 5, wherein the at least one resistor is connected in series with capacitance and inductance.

7. The apparatus of claim 5, further comprising:
a transformer coupled to the resonant circuit; and
a rectification circuit coupled to the transformer.

8. The apparatus of claim 5, wherein the apparatus includes a LLC resonant converter, a LCC resonant converter, a parallel-resonant converter, a series-resonant converter, or a combination thereof.

9. A resonant converter comprising:
a switching circuit coupled to an input voltage;
a resonant circuit coupled to the switching circuit;
at least one resistor coupled in series with the resonant circuit;
at least one switch coupled in parallel with the at least one resistor;
a transformer coupled to the resonant circuit;
a rectification circuit coupled to the transformer; and
a driver,
coupled to the switching circuit,
comprising a control module that is coupled to the at least one resistor and the at least one switch, and
configured to output to the switching circuit after the resonant converter is turned off, for limiting a peak current occurring in the switching circuit by resetting remaining in the turned-off resonant converter.

10. The resonant converter of claim 9, wherein
the control module turns off the at least one switch to make the at least one resistor consume energy in the resonant circuit, after the resonant converter is turned off, and
the control module turns on the at least one switch to restart a normal operation with a zero initial condition.

11. The resonant converter of claim 9, wherein the resonant converter includes a LLC resonant converter, a LCC resonant converter, a parallel-resonant converter, a series-resonant converter, or a combination thereof.

* * * * *